(12) United States Patent
Stringer

(10) Patent No.: US 8,491,053 B2
(45) Date of Patent: Jul. 23, 2013

(54) COCOON HUNTING HAMMOCK

(76) Inventor: Kirk Stringer, Republic, MO (US)

( * ) Notice: Subject to any disclaimer, the term of this patent is extended or adjusted under 35 U.S.C. 154(b) by 115 days.

(21) Appl. No.: 13/214,679

(22) Filed: Aug. 22, 2011

(65) Prior Publication Data
US 2012/0080916 A1 Apr. 5, 2012

Related U.S. Application Data

(60) Provisional application No. 61/389,352, filed on Oct. 4, 2010.

(51) Int. Cl.
*E04G 3/30* (2006.01)
*E04H 15/04* (2006.01)
*A63G 9/12* (2006.01)

(52) U.S. Cl.
USPC .............................. 297/273; 182/187; 135/90

(58) Field of Classification Search
USPC ................... 297/273, 277; 472/118; 182/187, 182/142, 145, 150
See application file for complete search history.

(56) References Cited

U.S. PATENT DOCUMENTS

| | | | |
|---|---|---|---|
| 4,347,913 A * | 9/1982 | Cromer, Jr. .................... | 182/142 |
| 4,886,143 A * | 12/1989 | Dubroc ......................... | 182/142 |
| 5,617,932 A | 4/1997 | Stuart | |
| 5,937,969 A * | 8/1999 | Woller et al. .................. | 182/187 |
| 6,698,131 B2 | 3/2004 | Latschaw | |
| 7,051,908 B2 | 5/2006 | Mignano | |
| 7,090,050 B1 * | 8/2006 | Hedgepeth ..................... | 182/142 |
| 7,219,680 B1 | 5/2007 | Gresock | |
| 7,870,933 B2 * | 1/2011 | McInnes ........................ | 182/128 |

\* cited by examiner

*Primary Examiner* — Sarah B McPartlin
(74) *Attorney, Agent, or Firm* — RG Patent Consulting LLC; Rachel Gilboy

(57) ABSTRACT

A camouflage hunting blind system comprising a hanger with a distal and a proximate end, the proximate end of the hanger comprises an S-hook for suspending a hammock chair which is then cloaked within a camouflaged covering. The distal end of the hanger is positioned against tree with the proximate end pointing upward and away from the tree at a 45 degree angle wherein both ends are secured using a tether. The camouflage hunting blind system is positioned so a user's feet may touch the ground to rotate hammock chair for (through) 360 degrees of view. The hammock chair may be reversible, having a first side with natural (nature camouflage) colorings and a second side with hunter orange or other suitable coloring (dark or other.) Camouflage hunting blind system may have a camouflage coloring on the outside and a dark coloring on the inside, and weigh less that 10 lbs, and sets up in a very short time. Camouflaged covering encapsulates hammock chair, concealing scent and providing warmth for its user(s).

20 Claims, 5 Drawing Sheets

COCOON HUNTING HAMMOCK

CROSS-REFERENCE TO RELATED APPLICATION

The present application is related to and claims priority from prior provisional application Ser. No. 61/389,352, filed Oct. 4, 2010 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of hunting and more specifically relates to hunting blinds.

2. Description of the Related Art

Hunting is the practice of pursuing wildlife for food, recreation, or trade. People in modern society practice hunting generally as sport or recreation, but in times of a poor economy, or in areas that are depressed economically, hunting is sometimes practiced more as a supplement to income by reducing the amount of food that would have had to have been bought. In earlier centuries, hunting was practiced to a greater degree to provide a food source for families but the practice gradually declined until the beginning of the $21^{st}$ century when only an estimated 6% of Americans hunted. As hunting moved from a subsistence activity to a social one, two trends emerged. One was that of the specialist hunter with special training and equipment. The other was the emergence of hunting as a 'sport'. The percentage of hunters in American society has increased due to modern sport hunting. Hunting in the United States is not associated with any particular class or culture as it sometimes is in some societies and so a larger percentage of the American population is likely to participate by comparison.

Modern day sport hunting is sophisticated in comparison with the hunting technology of past centuries. Firearms are now considerably more technologically advanced than the firearms of the past century. All-terrain vehicles can easily reach into rough or distant hunting grounds that once were considered virtually inaccessible for most people. Range finders can pinpoint the distance of wild game for archery hunters providing a distinct advantage for the hunter. For such a primitive hunting means, bows and bow accessories nowadays are mostly compound bows with a high degree of built in technology. Bow hunters are sportsmen that take pride in their skill of being able closely approach such wary and quick game as deer, elk, and turkey. Getting close enough to kill these types of game usually takes considerable skill and some hunting knowledge.

Some of the hunting accessories used, such as hunting blinds, are nearly a necessity in many environments where the hunter is unable to approach game within a reasonable distance of a firearm or bow-shot. The modern hunting sport has given rise to many different types of hunter blinds for concealment from animals and fowl. Most of these blind systems utilize a type of camouflaged material that blends with natural surroundings, and some type of framework to support the camouflage material. Blind systems can be either ground blinds or elevated blinds for use in trees or on elevated platforms, but the size and shape of these blinds often don't blend well into the surroundings, nor are they comfortable, nor do they retain body heat well. The majority of these blind systems are not easily transportable, utilize a considerable amount of materials and time to construct, and dictate that the hunter must set up the blind in advance of the hunt and then return to the same location for the hunt. Last minute changes in hunting location are usually not feasible due to the set-up time and level of difficulty to transport a blind system. A blind system is needed that is effective, is comfortable, and yet so lightweight that it is easily transportable while hunting and sets up in seconds.

Various attempts have been made to solve the above-mentioned problems such as those found in U.S. Pat. And Pub. Nos. 7,051,908, 5,617,932, 7,219,680, 2009/0165352, 6,698,131, and 2005/0183758. This prior art is representative of hunting blind systems. None of the above inventions and patents, taken either singly or in combination, is seen to describe the invention as claimed.

Ideally, a hunting blind system should be easy to setup, be readily transportable, and yet would operate reliably and be manufactured at a modest expense. Thus, a need exists for a reliable camouflage hunting blind system to provide transportability and ease of setup, and to avoid the above-mentioned problems.

BRIEF SUMMARY OF THE INVENTION

In view of the foregoing disadvantages inherent in the known hunting blinds art, the present invention provides a novel cocoon hunting hammock system. The general purpose of the present invention, which will be described subsequently in greater detail, is to provide greater portability, comfort, and stealth for the hunter during hunting expeditions.

A camouflage hunting blind system is disclosed herein preferably comprising a hanger with a distal and a proximate end, the distal end of hanger comprising a T-hook. The T-hook preferably comprises two open loops and two closed loops, the proximate end of the hanger comprising an S-hook for suspending a hammock chair which is then cloaked with a camouflaged covering.

To use, a tether such as a rope or a light chain is attached at one end to a tether-hook. The opposite end of the tether is passed through the enclosed eye of the proximate end S-hook of the hanger. The tether hook is passed around a high point on the tree and hooked back to the tether in a choker connection and the distal end of the hanger is positioned against the tree with the proximate end pointing upward and away from the tree at about a 45 degree angle (for stability.) The tether is then passed through a closed loop on the distal end of the hanger and looped over a first open hook on one side of the distal end and passed behind the tree to loop over the second open hook on the distal end of the hanger. The tether is then alternately looped multiple times around the open loops of distal end hanger, passing behind the tree each time, securing the distal end of hanger to the tree.

Next, a hammock (style) chair is removably suspended from the S-hook on the proximate end of the hanger and a camouflage covering is draped about the chair and suspended from the S-hook such that an occupant hunter may be suitably camouflaged during the hunting activity. The vertical post that the present invention is tethered to may comprise a tree but may be any sturdy vertical object of sufficient diameter such as a telephone pole or the like. The hanger preferably comprises ferrous material and is approximately 14" in length but in certain embodiments may comprise other metals or materials of sufficient strength to support a user or be of varying lengths.

The hammock chair may support a user (hunter or nature-watcher) in a suspended sitting position preferably within proximity to a ground surface such that a user sitting in the hammock chair may touch the ground surface with the user's feet (for safety reasons.) Following approval from future safety testing this product may be used up in a tree stand where the user's feet are in contact with the platform. When the user is sitting in the hammock chair suspended from the S-hook with feet contacting a ground surface, the user may rotate through 360 degrees using his/her feet to view the surroundings getting a complete view of approaching wildlife. In this way the user may be disguised from view (by a wild animal) while sitting comfortably in the hammock chair within the camouflage covering.

In certain embodiments, the camouflage covering may be reversible such that a first side of camouflage covering may be colored with natural surrounding colors and a second side of camouflage covering may be a different camouflage pattern or dark (charcoal or other), and may be made of a waterproof or a water resistant material. The covering is reversible. The camouflage covering is enclosable with a zipper or other suitable fastener system such that a user and hammock chair is disguised within its surroundings, allowing user to be camouflaged in an outdoor environment. The camouflage covering may incorporate a floor and a hood for protection of the hunter from the elements and or insects and zip-down flaps with see-through netting for ease of viewing. The hammock chair may also comprise camouflage on a first side and hunter orange on the second side and it is reversible. The hammock chair and hanger may be used for various activities while camping, viewing sporting events, sitting on a boat dock, a back porch or the like. The camouflage hunting blind system is easily portable and comprises a carrying case with a strap and a drawstring.

The camouflage hunting blind system may further comprise a kit for use in hunting and/or nature-watching having: at least one hanger; at least one tether; at least one tether-hook; at least one hammock chair; at least one camouflage covering; and a set of user instructions.

A method of use for a camouflage hunting blind system may comprise the steps of: positioning the distal end of the hanger against a pole with the proximate end at about a 45 degree upward angle (relative the post/tree it is attached to); fastening the distal end of the hanger to the pole/tree with the tether; looping the tether around the pole at a high point; hooking the tether-hook to the S-hook on the hanger at the proximate end of the hanger; adjusting tether to remove slack and securing it at the upward 45 degree angle pointing away from the tree or post; hanging a camouflage covering from the S-hook at the proximate end of the hanger; hanging a hammock chair from the S-hook within camouflage covering; and using camouflaged hunting blind system for observing wild animals.

The present invention holds significant improvements and serves as a camouflage hunting blind system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, cocoon hunting hammock systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a hunting blind and more particularly to a camouflage hunting blind system as used to improve the portability, comfort, and convenience of packing and setting up a hunting blind system.

Figure 1:
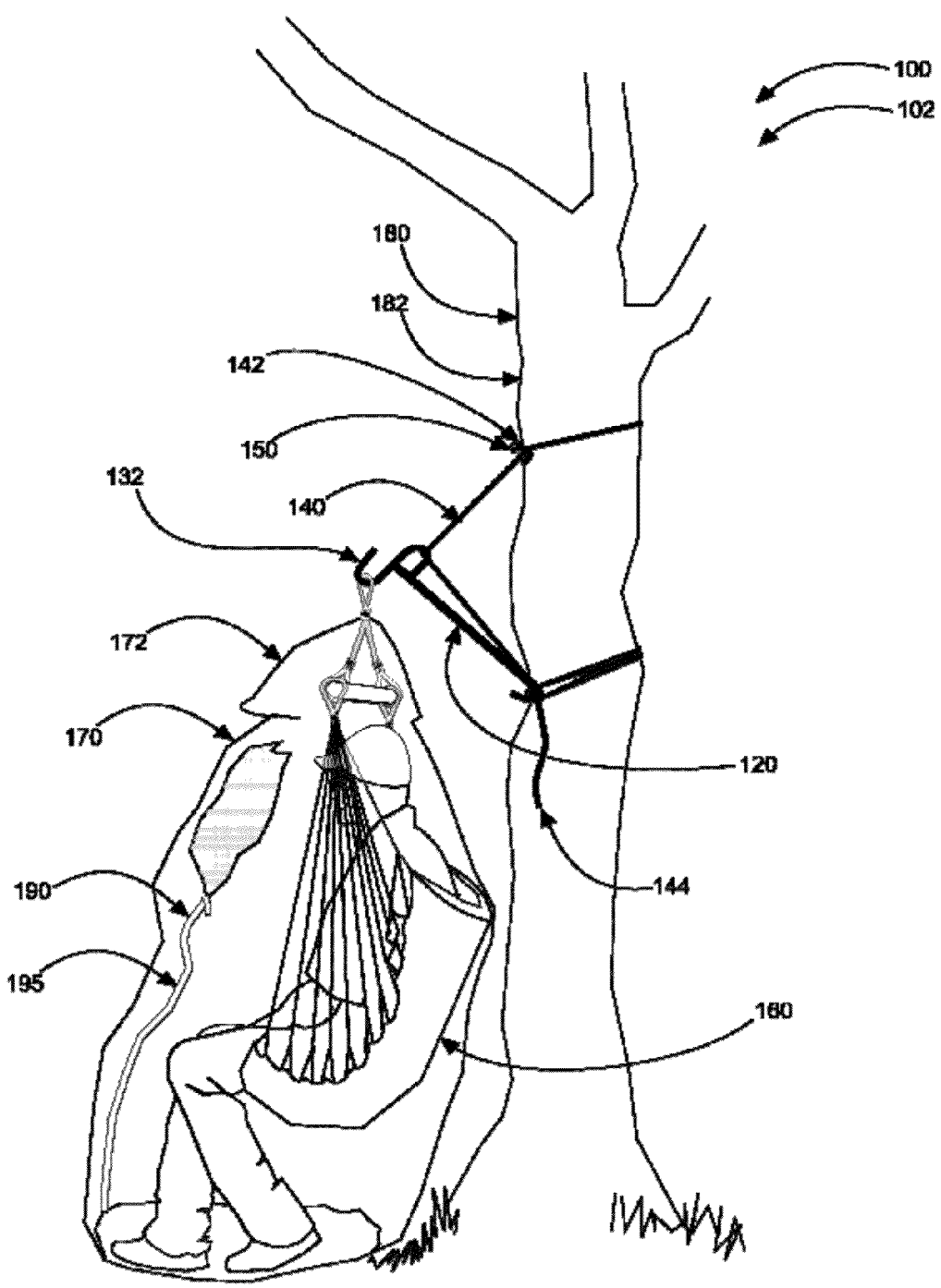
FIG. 1 shows a perspective view illustrating a cocoon hunting hammock system with a camouflage covering in an in-use condition according to an embodiment of the present invention.

Referring to the drawings by numerals of reference there is shown in FIG. 1, is a perspective view illustrating an in-use condition of cocoon hunting hammock system 100 with camouflage covering 170 according to a preferred embodiment of the present invention. Cocoon hunting hammock system 100 is shown as suspended from main trunk of a tree (vertical post 180) in this FIG. 1 and shown as suspended from a strong branch of the tree (vertical post 180) in this FIG. 3 showing its versatility of use.

Figure 2:
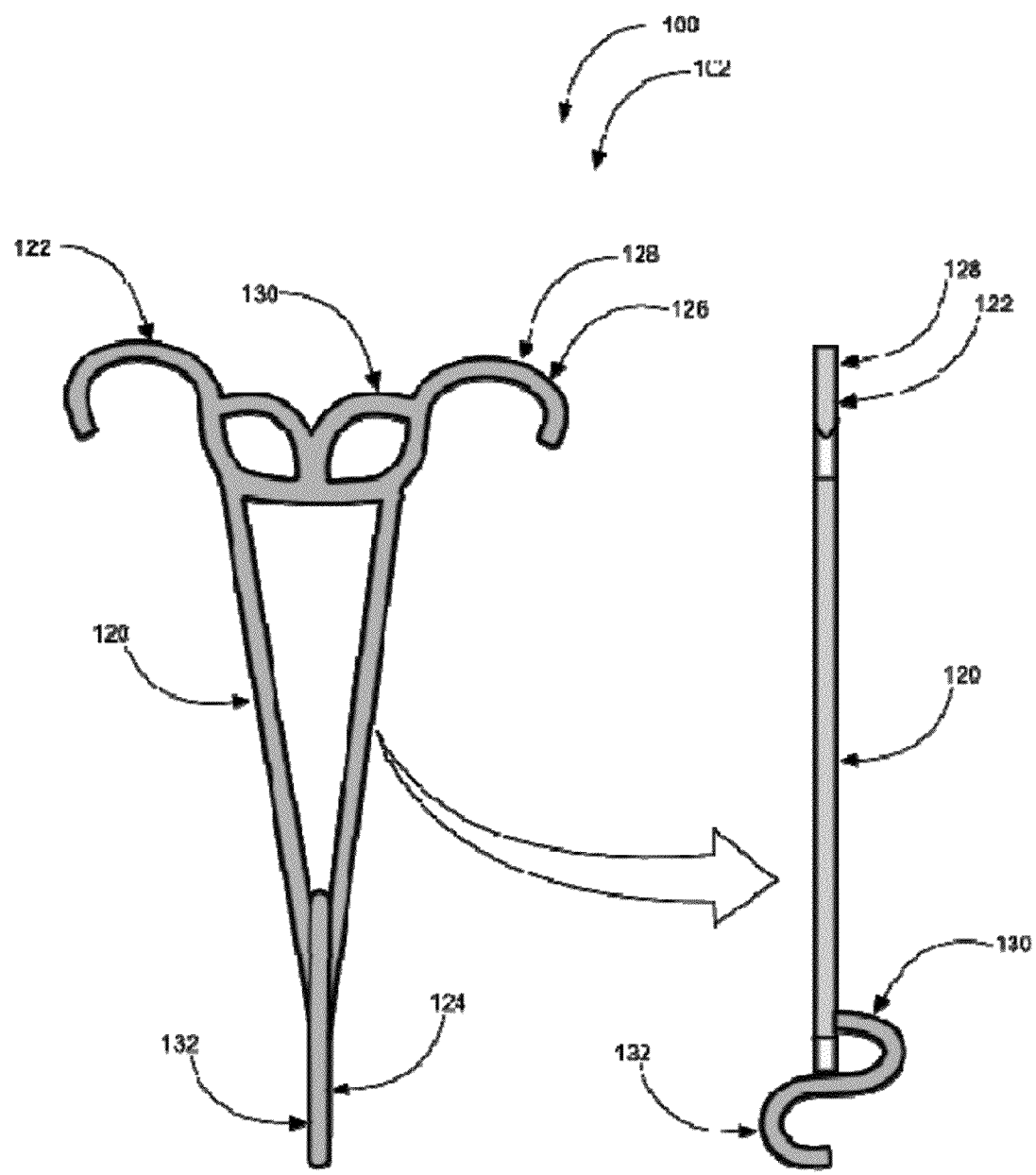
FIG. 2 is a perspective view illustrating a hanger of the cocoon hunting hammock system according to an embodiment of the present invention of FIG. 1.
Figure 4:
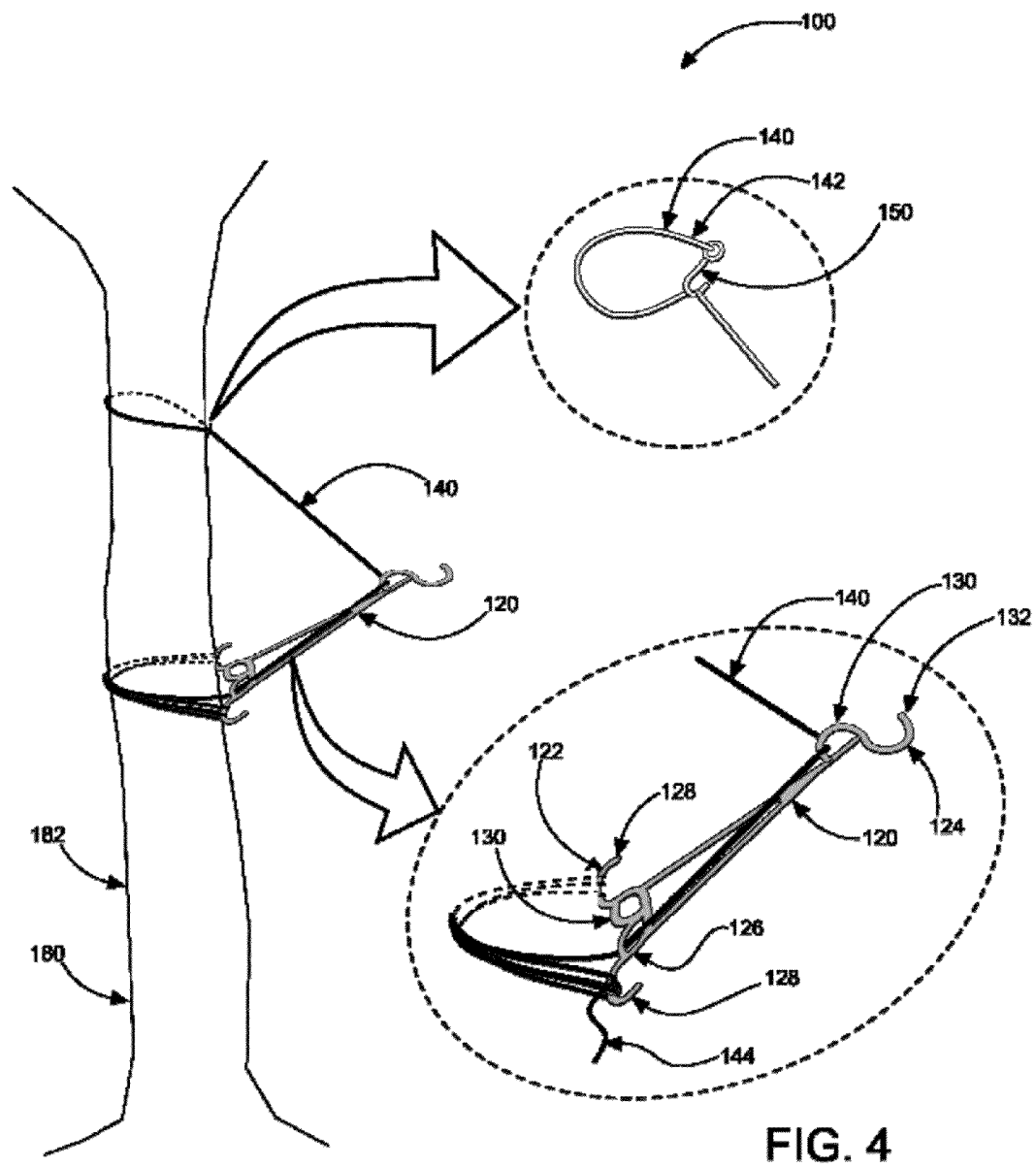
FIG. 4 is a perspective view illustrating the hanger of the cocoon hunting hammock system as fastened to a tree (or vertical post) according to an embodiment of the present invention of FIG. 1.

In this particular embodiment shown (also referencing FIGS. 2 and 4, camouflage hunting blind system 102 may comprise hanger 120 with distal end 122 and proximate end 124; with end of hanger 120 comprising T-hook 126 and with T-hook 126 comprising two open loop(s) 128 and two closed loop(s) 130. Proximate end 124 of hanger 120 preferably comprises S-hook 132 (as shown in FIGS. 2 and 4).

Figure 3:
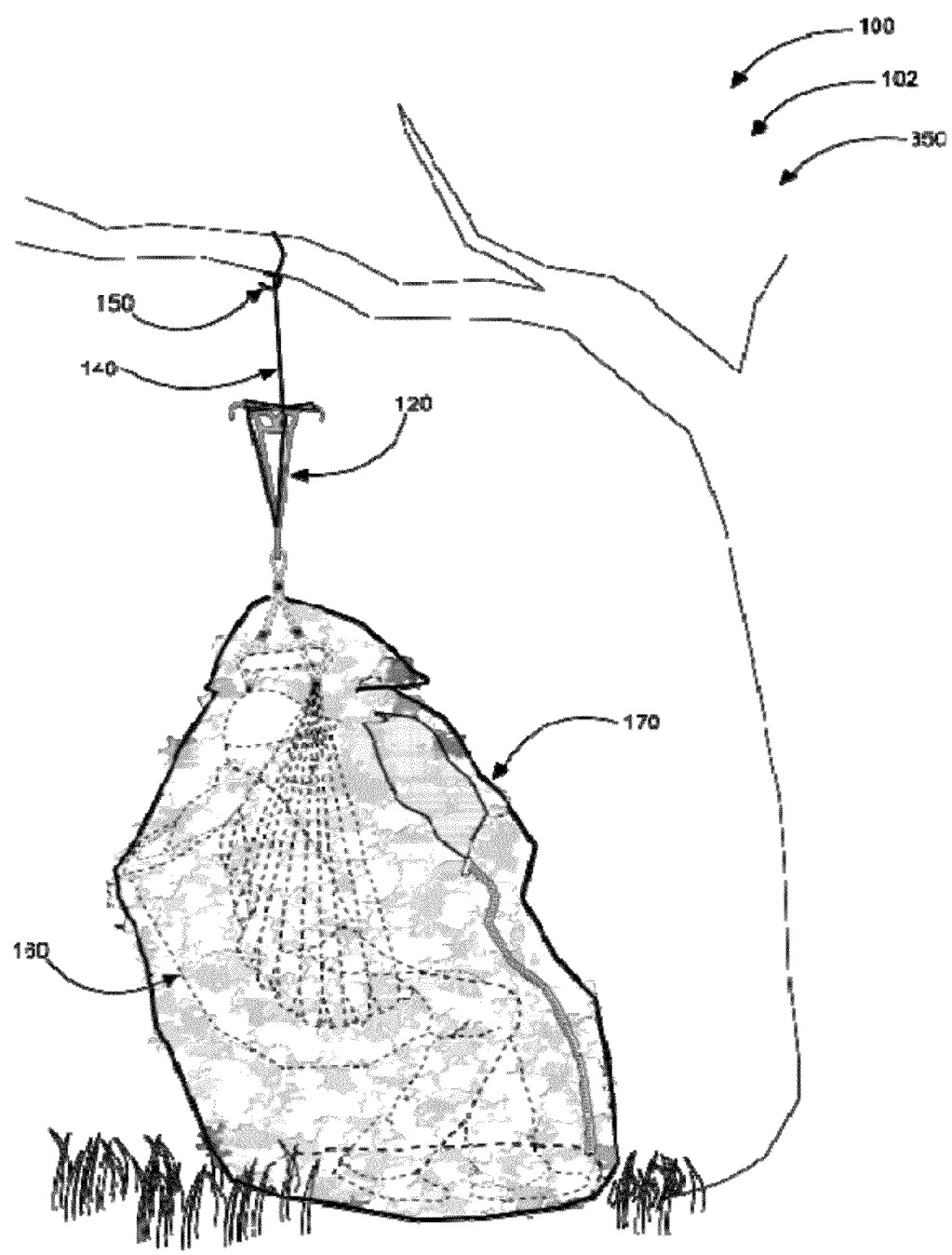
FIG. 3 is a perspective view illustrating the cocoon hunting hammock system hammock chair and camouflage covering in another in-use condition pose according to an embodiment of the present invention of FIG. 1.

Referring now back to FIGS. 1 and 3, tether 140 or other suitable attaching means comprises first end 142 and second end 144. Tether-hook 150 may be attached to first end 142 of tether 140, hammock chair assembly 160, and camouflage covering 170. Hanger 120 is removably attachable to vertical post 180, as shown, with (using) tether 140 in the following way: first end 142 of tether 140 with tether-hook 150 attaches about vertical post 180 and back to tether 140 in choker fashion, second end 144 passes through closed loop(s) 130 on S-hook 132 at proximate end 124 of hanger 120 and then through one closed loop(s) 130 on distal end 122 of hanger 120. Distal end 122 of hanger 120 is then restable against vertical post 180 and removably affixed using tether 140, with proximate end 124 of hanger 120 extending upwardly and outwardly from vertical post 180 at about a 45 degree agree relative to vertical post 180. In this way (and others the present invention may be secured to vertical post 180 for use).

At least one hammock chair assembly 160 is then removably hooked onto S-hook 132 of proximate end 124 of hanger 120 and camouflage covering 170 is suspended from S-hook 132 and draped about hammock chair assembly 160 such that the user residing within hammock chair assembly 160 is disguised within its surroundings. Camouflage hunting blind system 102 is easily portable and may be set up in less than two minutes (for experienced users.) Camouflage hunting blind system 102 in the embodiment shown weighs less than 10 pounds and rolls up tightly to be placed inside of a carrying case with at least one but preferably two carrying straps and a drawstring. In this way the present invention is portable and easy to use. Hanger 120 may also comprise different shapes and configurations and is of suitable design and durability to hold at least one user safely during the hunting/watching activity.

Referring now to FIG. 2, a perspective view illustrating hanger 120 of cocoon hunting hammock system 100 according to an embodiment of the present invention of FIG. 1.

Hanger 120 may be attached to a (substantially circular) vertical post 180 of a diameter within a given range. Vertical post 180 preferably comprises a tree 182 that may be used during a hunting period (since trees 182 are normally found within the wildlife's natural environment.) Hanger 120, as used, may comprise a ferrous material or a non-ferrous material of sufficient strength to support at least 250 pounds (at least the weight of an average man and the hung equipment.) Hanger 120 is approximately 14" in length, sufficient to suspend camouflage hunting blind system 102 away from tree 182 enough to rotate hammock chair assembly 160 about 360 degrees for a full field of vision. When cocoon hunting hammock system 100 (may comprise hammock chair/boslom chair; wherein hammock chair may comprise boslom chair) is suspended from an overhead horizontal branch (as in FIG. 3), a full 360 degree rotation and field of view is achievable. When camouflage hunting blind system 102 is suspended from a horizontal branch, hanger 120 is utilized in a substantially vertical position still leaving S-hook 132 at an angle such that hammock chair assembly 160 and camouflage covering 170 may be safely suspended (and rotated.)

Referring now again more specifically to FIG. 3, a perspective view illustrating cocoon hunting hammock system 100 hammock chair assembly 160, and camouflage covering 170 according to an embodiment of the present invention of FIG. 1. Hammock chair assembly 160 may support a user in a suspended position from vertical post 180 or tree 182. When in use by a hunter and/or nature-watcher sitting in hammock chair assembly 160, the hunter and/or nature-watcher may be disguised within camouflage covering 170 from view by an animal. As previously mentioned for safety reasons, camouflage hunting blind system 102 is for use within reasonable proximity to a ground surface, such that user sitting in hammock chair assembly 160 can touch a ground surface.

When hammock chair assembly 160 is hanging on S-hook 132, it is rotatable through 360 degrees in this particular hanging orientation. Camouflage covering 170 may be reversible such that a first side of camouflage covering 170 is colored with natural surrounding colors and a second side of camouflage covering 170 may be a dark charcoal or black color or may be a second camouflage pattern so that a user may the place the preferable pattern toward the outside for greater concealment from game. Camouflage covering 170 is preferably water resistant (or substantially waterproof) and is able to keep a user at a warmer temperature than surrounding ambient temperature as well as provide containment of human scent. Camouflage covering 170 is encloseable with fastener 190 such that the user may be disguised to a user-preferred amount/degree. Fastener 190 may comprise a zipper 195 for ease of use or other suitable equivalent. Camouflage covering 170 may comprise (see-through) netting with zip-down flaps. Camouflage covering 170 may comprise a floor as protection from insects and reptiles as well as to provide greater covering as an isolation means from cold ground temperatures and may comprise zip down flaps exposing see-through netting for greater viewing. Camouflage covering 170 may also comprise a hood 172 for covering the user from rain or as a shading device from the sun. In certain embodiments a circulating fan may be included to remove $CO_2$, scent or other (may use activated charcoal or the like.)

Referring now to FIG. 4 a perspective view illustrating the cocoon hunting hammock system 100 hanger 120 as fastened to a tree 182 according to an embodiment of the present invention of FIG. 1.

Distal end 122 of hanger 120 is restable against vertical post 180 and removably affixed using tether 140, with proximate end 124 of hanger 120 extending upwardly and outwardly from vertical post 180 or tree 182 at approximately a 45 degree angle. Tether-hook 150 is passed around a high point on tree 182 and hooked back to the tether 140 in a choker connection and distal end 122 of hanger 120 is positioned against tree 182 with proximate end 124 pointing upward and away from tree 182 at about a 45 degree angle. Tether 140 is then passed through closed loop(s) 130 on the distal end 122 of hanger 120 and looped over a first open hook on one side of distal end 122 and passed behind the tree 182 to loop over the second open hook on distal end 122 of the hanger 120. Tether 140 is alternately looped multiple times around open loops of distal end 122, passing behind the tree 182 each time, securing distal end 122 of hanger 120 to tree 182. It should be appreciated that the fastening system and means is not intended to be limited to that which is described herein, but rather that other equivalent tying means may be employed and still be considered to be within the scope of the present invention, that the means disclosed is by way of enablement such that the present invention may be used in one safe manner (of many.)

Cocoon hunting hammock system 100 may be sold as kit 440 comprising the following parts: at least one hanger 120 at least one tether 140; at least one tether-hook 150; at least one hammock chair assembly 160; at least one camouflage covering 170; and at least one set of user instructions. Cocoon Hunting Hammock System 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
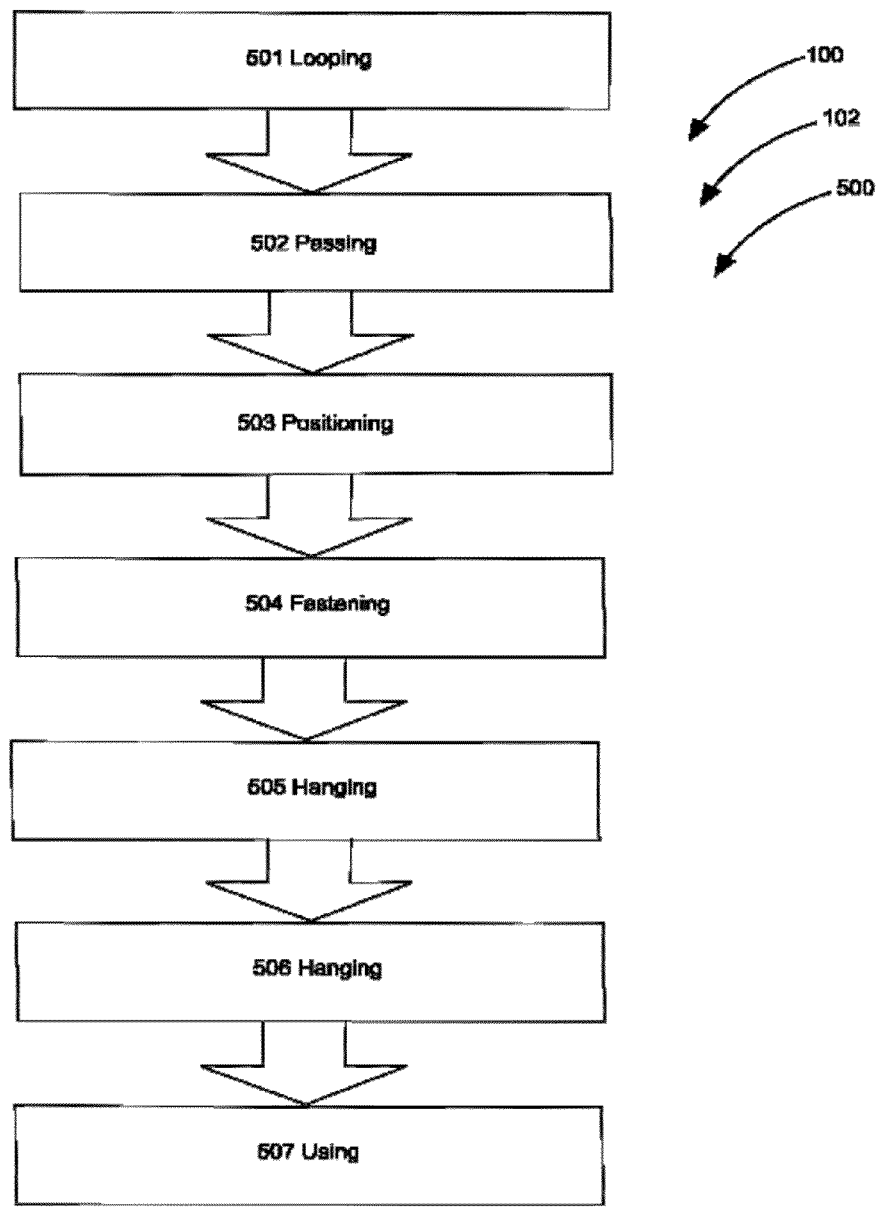
FIG. 5 is a flowchart illustrating a method of use for the cocoon hunting hammock system according to an embodiment of the present invention of FIGS. 1-4.

Referring now to FIG. 5, showing a flowchart illustrating a method of use 500 for cocoon hunting hammock system 100 according to an embodiment of the present invention of FIGS. 1-4.

Method of use 500 for cocoon hunting hammock 100 system may comprise the steps of: steps one 501—step one 507 starting with step one 501 looping a first end of tether 140 with tether-hook 150 around a vertical post 180 at a high point and hooking tether-hook 150 back to tether 140 using a choker connection; step two 502 passing a second end 144 of tether 140, first through closed loop(s) 130 of S-hook 132 on proximate end 124 of hanger 120 and then through closed loop(s) 130 on a distal end 122 of hanger 120; step three 503 positioning distal end 122 of hanger 120 against vertical post 180 with proximate end 124 at about a 45 degree upward angle pointing away from vertical post 180; step four 504 fastening distal end 122 of hanger 120 to vertical post 180 with tether 140 using open loop(s) 128 on distal end 122 of hanger 120; step five 505 hanging a camouflage covering 170 from S-hook 132 from proximate end 124 of hanger 120; step six 506 hanging hammock chair assembly 160 from S-hook 132 within camouflage covering 170; and step seven 507 using cocoon hunting hammock system 100 as an animal watching or camouflage hunting blind system 102. It should be noted that steps 505 and 507 are optional steps and may not be implemented in all cases.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A camouflage hunting blind system comprising:
   a) a hanger with a distal and a proximate end;
      i) said distal end of said hanger comprising a T-hook, said T-hook
      ii) comprising two open loops and two closed loops;
      iii) said proximate end of said hanger comprising an S-hook;
   b) a tether;
   c) a tether-hook;
   d) a hammock chair; and
   e) a camouflage covering;
   f) wherein said hanger is removably attachable to a vertical post with said tether and said tether-hook attaches about said vertical post to said S-hook, said tether being lashed around said vertical post and looped through said closed loops;
   g) wherein said distal end of said hanger is restable against said vertical post and removably affixed using said tether, with said proximate end of said hanger extending upwardly and outwardly from said vertical post;
   h) wherein said hammock chair assembly is removably hooked onto said S-hook of said proximate end of said hanger; and
   i) wherein said camouflage covering is suspended from said S-hook and draped about said hammock chair such that a user suspended in said hammock chair and is disguised within its surroundings.

2. The camouflage hunting blind system of claim 1 wherein said camouflage hunting blind is portable.

3. The camouflage hunting blind system of claim 1 wherein said hammock chair may support said user in a suspended position.

4. The camouflage hunting blind system of claim 3 wherein said user, when sitting in said hammock chair, may be disguised within said camouflage covering from view by an animal.

5. The camouflage hunting blind system of claim 1 wherein said camouflage hunting blind system is for use within proximity to a ground surface such that said user sitting in said hammock chair can touch said ground surface with feet of said user.

6. The camouflage hunting blind system of claim 1 wherein said hammock chair when hanging on said S-hook is rotatable through 360 degrees.

7. The camouflage hunting blind system of claim 1 wherein said camouflage covering is reversible such that a first side of said camouflage covering is colored with natural surrounding colors and a second side of said camouflage covering is a dark color.

8. The camouflage hunting blind system of claim 7 wherein said camouflage covering is closeable with a fastener such that said user may be disguised.

9. The camouflage hunting blind system of claim 8 wherein said fastener comprises a zipper.

10. The camouflage hunting blind system of claim 7 wherein said camouflage covering comprises a floor.

11. The camouflage hunting blind system of claim 7 wherein said camouflage covering comprises a hood.

12. The camouflage hunting blind system of claim 1 wherein said camouflage covering is water-resistant and has see-through netting flaps.

13. The camouflage hunting blind system of claim 1 wherein said vertical post comprises a tree.

14. The camouflage hunting blind system of claim 1 wherein said camouflage hunting blind comprises a carrying case with at least one strap and a drawstring.

15. The camouflage hunting blind system of claim 1 wherein said hanger comprises ferrous material.

16. The camouflage hunting blind system of claim 1 wherein said hanger is approximately 14" in length.

17. The camouflage hunting blind system of claim 1 wherein said distal end of said hanger is restable against said vertical post and removably affixed using said tether, with said proximate end of said hanger extending upwardly and outwardly from said vertical post at about a 45 degree angle.

18. A camouflage hunting blind system comprising:
a) a hanger with a distal and a proximate end;
  i) said distal end of said hanger comprising a T-hook, said T-hook
  ii) comprising two open loops and two closed loops; said proximate end of
  iii) said hanger comprising an S-hook;
b) a tether;
c) a tether-hook;
d) a hammock chair; and
e) a camouflage covering;
f) wherein said hanger is removably attachable to a vertical post with said tether and said tether-hook attached about said vertical post to said S-hook, said tether lashed around said vertical post and looped through said closed loops;
g) wherein said distal end of said hanger is restable against said vertical post and removably affixed using said tether, with said proximate end of said hanger extending upwardly and outwardly from said vertical post at a 45 degree angle;
h) wherein said vertical post comprises a tree;
i) wherein said hammock chair assembly is removably hooked onto said S-hook of said proximate end of said hanger;
j) wherein said hanger comprises ferrous material and is approximately 14" in length;
k) wherein said hammock chair may support a user in a suspended sitting position;
l) wherein said camouflage hunting blind system is for use within proximity to a ground surface such that said user sitting in said hammock chair can touch said ground surface with at least one foot of said user;
m) wherein said hammock chair when hanging on said S-hook is rotatable through 360 degrees;
n) wherein said user, when sitting in said hammock chair, may be disguised within said camouflage covering from view by an animal;
o) wherein said camouflage covering is reversible such that a first side of said camouflage covering is colored with natural surrounding colors and a second side of said camouflage covering is a dark color;
p) wherein said camouflage covering is water-resistant;
q) wherein said camouflage covering is closeable with a zipper fastener such that said user may be disguised;
r) wherein said camouflage covering has zip-down windows with see-through netting;
s) wherein said camouflage covering comprises a floor and a hood;
t) wherein said camouflage hunting blind is portable;
u) wherein said camouflage hunting blind comprises a carrying case with a strap and a drawstring; and
v) wherein said camouflage covering is suspendable from said S-hook and draped about said hammock chair such that said hammock chair and said user are disguised within environmental surroundings, allowing said user to be camouflaged within an outdoor environment.

19. The camouflage hunting blind system of claim 18 further comprising a kit having:
a) at least one said hanger;
b) at least one said tether;
c) at least one said tether-hook;
d) at least one said hammock chair;
e) at least one said camouflage covering; and
f) a set of user instructions.

20. A method of use for a camouflage hunting blind system comprising the steps of:
a) looping a first end of a tether with a tether-hook around a tree at a high point and hooking said tether-hook back to said tether using a choker connection;
b) passing a second end of said tether, first through an enclosed loop of an S-hook on a proximate end of a hanger and then through an enclosed loop on a distal end of said hanger;
c) positioning said distal end of said hanger against said tree with said proximate end at about a 45 degree upward angle pointing away from said tree;
d) fastening said distal end of said hanger to said vertical post with said tether using said two open loops on said distal end of said hanger;
e) hanging a camouflage covering from said S-hook from said proximate end of said hanger;
f) hanging a hammock chair from said S-hook within said camouflage covering; and
g) using said camouflage covering as an animal watching or hunting blind system.

* * * * *